United States Patent
Sengar et al.

(10) Patent No.: US 8,096,747 B2
(45) Date of Patent: Jan. 17, 2012

(54) APPARATUS AND RELATED METHODS FOR TURBINE COOLING

(75) Inventors: Ajit Singh Sengar, Kharela (IN); Nattamai Venkataraman Saravanan, Chennai (IN); Nagaraj Sathya Subramanya, Bangalore (IN)

(73) Assignee: General Electric Company, Schenectady, NY (US)

( * ) Notice: Subject to any disclaimer, the term of this patent is extended or adjusted under 35 U.S.C. 154(b) by 1021 days.

(21) Appl. No.: 12/024,235

(22) Filed: Feb. 1, 2008

(65) Prior Publication Data

US 2009/0196736 A1 Aug. 6, 2009

(51) Int. Cl.
*F01D 5/08* (2006.01)

(52) U.S. Cl. ............ 415/1; 415/115; 415/116; 415/117

(58) Field of Classification Search ............ 415/1, 115, 415/116, 117
See application file for complete search history.

(56) References Cited

U.S. PATENT DOCUMENTS

| | | | |
|---|---|---|---|
| 2,940,257 A * | 6/1960 | Kuhl et al. | 60/39.511 |
| 4,901,520 A | 2/1990 | Kozak et al. | |
| 5,724,806 A | 3/1998 | Horner | |
| 5,778,675 A | 7/1998 | Nakhamkin | |
| 5,782,076 A | 7/1998 | Huber et al. | |
| 6,038,849 A | 3/2000 | Nakhamkin et al. | |
| 6,389,793 B1 | 5/2002 | Priestley | |
| 6,550,253 B2 | 4/2003 | Mortzheim et al. | |
| 7,581,401 B2 * | 9/2009 | West et al. | 60/772 |

* cited by examiner

*Primary Examiner* — Igor Kershteyn
(74) *Attorney, Agent, or Firm* — Nixon & Vanderhye P.C.

(57) ABSTRACT

An apparatus and a method for cooling and/or sealing a gas turbine by selectively boosting the pressure of air extracted at a lower extraction stage is provided. The pressure of the extracted air is boosted by an external compressor before it becomes available for cooling and/or sealing the turbine components. A bypass line includes a higher extraction stage providing air for cooling the turbine.

14 Claims, 3 Drawing Sheets

APPARATUS AND RELATED METHODS FOR TURBINE COOLING

BACKGROUND OF THE INVENTION

Gas turbines ("GT") generally use air bled from one or more stages/ports of the main GT compressor to provide cooling and/or sealing of the components in the path of hot gasses inside the GT. Air is extracted from the compressor and externally routed to the locations that require cooling in the turbine section. Any air compressed in the compressor and not used in generating combustion gases reduces the efficiency of the engine. Therefore, it is desirable to reduce the amount of cooling air bled from the compressor.

This air must have sufficiently higher pressure compared to the pressure of the hot combustion gas inside the GT (back pressure margin), to prevent inadvertent hot gas ingestion into the cooling system. The pressure required by the turbine components determines the stage where the air is extracted from the compressor. To ensure sufficient delivery pressure, it is desirable to select the extraction stage/port with higher pressures. Location of the extraction ports in order to preclude stall and surge is another parameter that limits the available extraction points along the compressor stages. However, extracting air from the earliest possible stage of the compressor will increase the compressor efficiency by reducing the amount of work lost in the extracted air. Therefore, it is desirable to get the cooling flow for turbine components with sufficient back pressure margin using lowest possible stage extraction of the compressor.

Compressors have extraction ports located at different stages to extract air of appropriate pressure for turbine cooling over the entire gas turbine operating conditions. However, sizing the system for meeting the design requirements (for example, minimum flow, backpressure margin, source to sink pressure ratio) at worst operating conditions (i.e., operating load, ambient temperature) leads to excessive compressor bleed on other operating conditions. This leads to loss in both useful power output and efficiency.

FIG. 1 shows the principle of operation of conventional cooling systems in turbomachinery. Compressor 10 has an inlet 16 to draw in ambient air. Compressor air can be extracted from various locations of the compressor and supplied to various locations in the turbine 14 that require cooling. The extraction locations are chosen to supply air at the required pressures. Remaining compressor air 18 is supplied to combustor 12 where it mixes with fuel 20. The hot combustion gas is then supplied to the turbine component 14 via stream 22. A single shaft 34 drives the generator 32. Flow streams 26, 28 and 30 represent cooling air extractions from the compressor that are routed to the turbine section of the turbomachinery for cooling hot gas path components. Streams 26 and 28 supply the low and intermediate pressure coolant, respectively, and they may be routed via external piping to the parts that need cooling. Stream 30 supplies the high pressure coolant and is extracted from a higher stage unit (for example, stage 15, or stage 16 or compressor discharge) in order to meet the back pressure margin as well as the mass flow requirement. Stream 30 is typically routed internally of the turbomachinery, for example, through the bore of the compressor-turbine rotor.

Intermediate and/or lower pressure air is passed through a conventional orifice which regulates the mass flow delivered for cooling, and reduces the excess pressure, before it enters turbine 14, for example, the turbine stage nozzle. However, the static orifice does not adjust to day variations in the ambient temperature. As the variation in the ambient temperature causes variation in the air pressure, this design leads to excess cooling flow extraction and concomitant performance penalty.

As a modification of the above system, typically, a flow-modulating valve is introduced in the path of the intermediate and/or lower pressure air to help regulate the cooling mass flow rate with ambient day variations. However, this does not eliminate the throttling requirement.

A further modification, as explained in U.S. Pat. No. 6,550,253, involves use of an ejector in the intermediate flow path. In this modified system, lower stage flow (for example, $9^{th}$ stage extraction air) serves as the suction flow and intermediate stage extracted air (for example, from $13^{th}$ stage) is used as the motive flow. This leads to savings in expensive intermediate stage cooling air and associated compression work. The performance of an ejector is very sensitive to upstream suction pressure as well as discharge pressure variation. For this reason, the performance is affected greatly by ambient day variations.

Priestley (U.S. Pat. No. 6,389,793) discloses an alternate cooling method where an external compressor breathing in ambient air is installed in parallel to the main GT compressor. This increases the availability of air for combustion and therefore it augments GT power output. FIG. 2 shows an example of this alternative method. For the sake of convenience, reference numerals similar to those used in FIG. 1 are used for corresponding components, but with the prefix "1" added. The respective low, intermediate and high pressure cooling air streams 126, 128 and 130 are generated by a separate external compressor 136 driven by motor 138. However, this method requires the external compressor to supply high pressure ratios and hence must be designed accordingly. In addition, the volume flow rates involved are high, thus increasing the external compressor size, weight and, consequently, the cost.

Kozak (U.S. Pat. No. 4,901,520) discloses a cooling system for a GT engine, wherein air is bled from the final compressor, and subsequently is additionally pressurized by a secondary compressor to increase the pressure before it is delivered to the turbine section of the engine. However, in the above cooling system, the secondary compressor is in the interior of the gas turbine, an extension of the first, main compressor. In addition to the extraction pressure being high, the final temperature of the air after the secondary compressor remains high. Hence, there would not be any reduction in the cooling flow requirement and associated non-chargeable air reduction benefits.

BRIEF DESCRIPTION OF THE INVENTION

Described herein is an apparatus and a method for regulating the fluid flow in turbomachinery by selectively boosting the pressure of the fluid flow extracted from an extraction stage. A first fluid flow is established at a compressor of the turbomachinery and directed to an external component of the turbomachinery for selective boosting of the pressure of the fluid flow. The resulting second fluid flow is directed to an interior component of the turbomachinery for cooling. The method eliminates the need for raising the pressure much above the supply point pressure, as dictated by the available compressor extraction ports, as done in conventional design, thus enhancing the efficiency of the turbomachinery being cooled, for example, gas turbines. The resulting decrease in the discharge temperature of the cooling air yields a decrease in total mass extracted from the compressor, thus producing less chargeable air being added downstream of the combustion chamber of the turbomachinery. The increased mass flow to the combustor provides more power output by burning more fuel in the gas turbine.

In one embodiment, the apparatus includes an extraction port, from which a first fluid flow is created and directed to a first site in the exterior of the turbomachinery, and a component external to the turbomachinery which establishes a second fluid flow having pressure higher than the pressure of the first flow. Subsequently, the second flow is directed to a second site in the interior of the turbomachinery for cooling and/or sealing of the components therein.

In another embodiment, a method for providing cooling and/or sealing air to the interior of turbomachinery includes extracting a first fluid flow from an extraction stage, directing the flow to a first site in the exterior of the turbomachinery and creating a second flow having pressure higher than that of the first flow, and delivering the second flow with the boosted pressure to components in the interior of the turbomachinery.

DETAILED DESCRIPTION OF THE INVENTION

Figure 1:
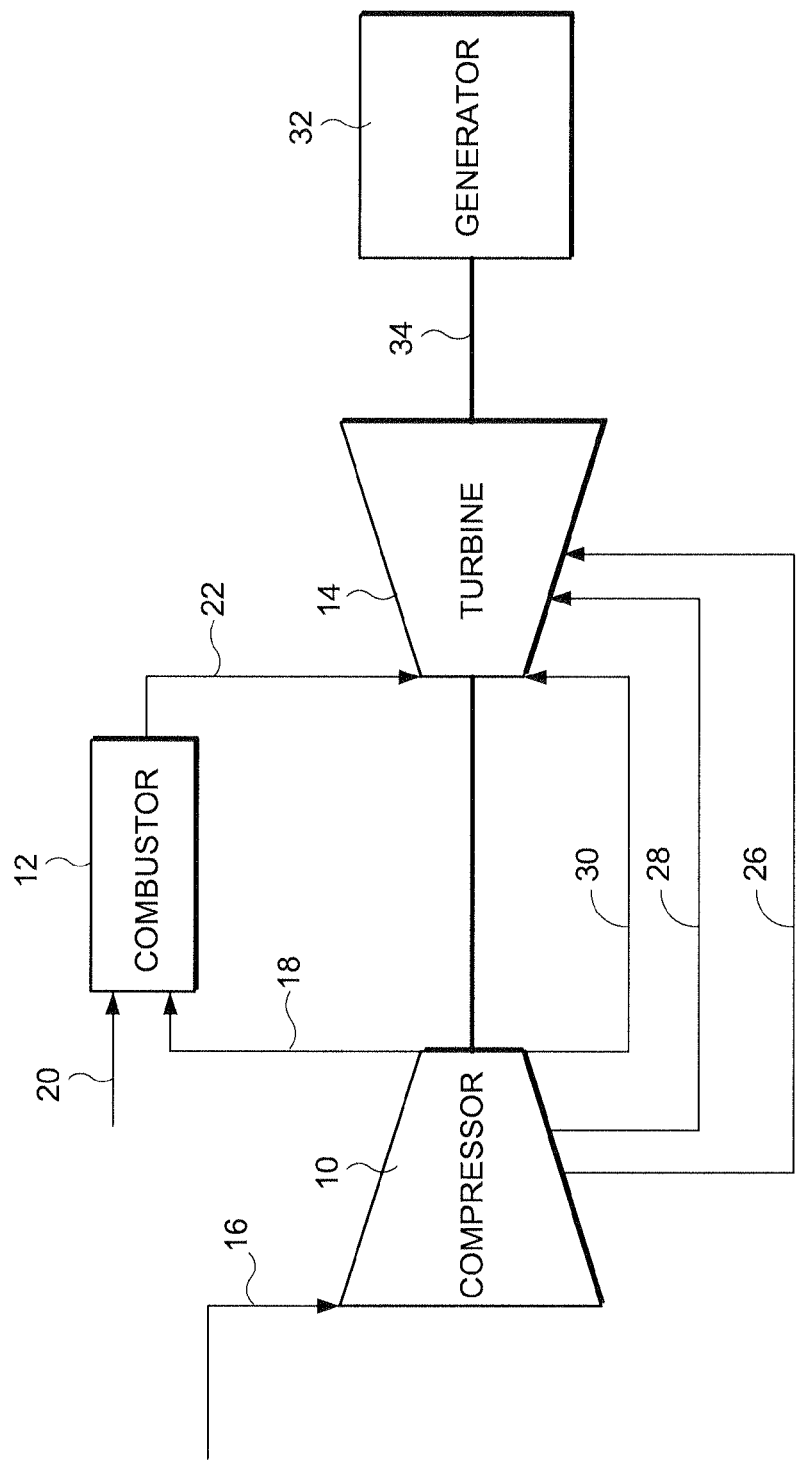
FIG. 1 is a schematic diagram of a conventional cooling method for gas turbines.
Figure 2:
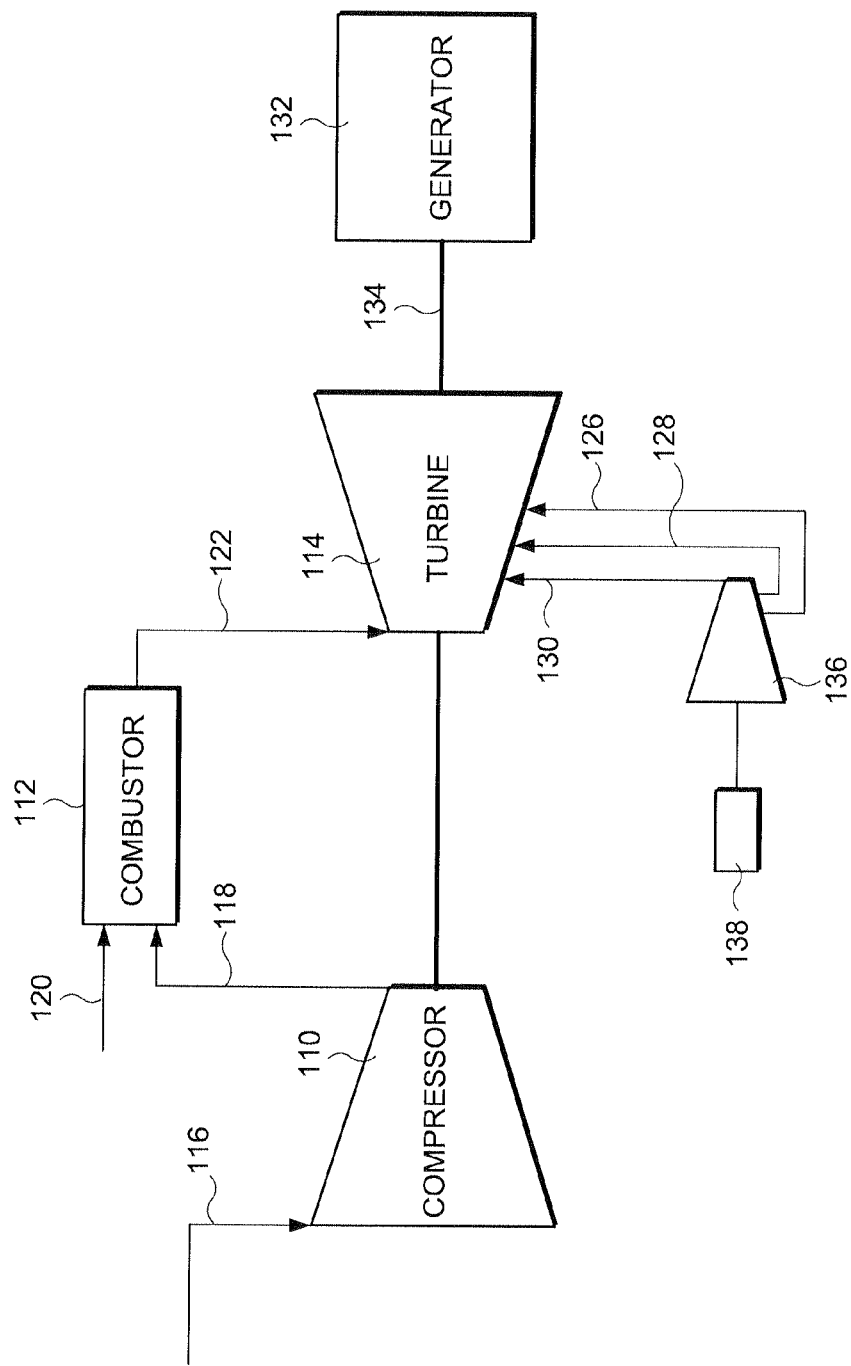
FIG. 2 shows a variation of a conventional cooling method using an external compressor breathing in ambient air.
Figure 3:
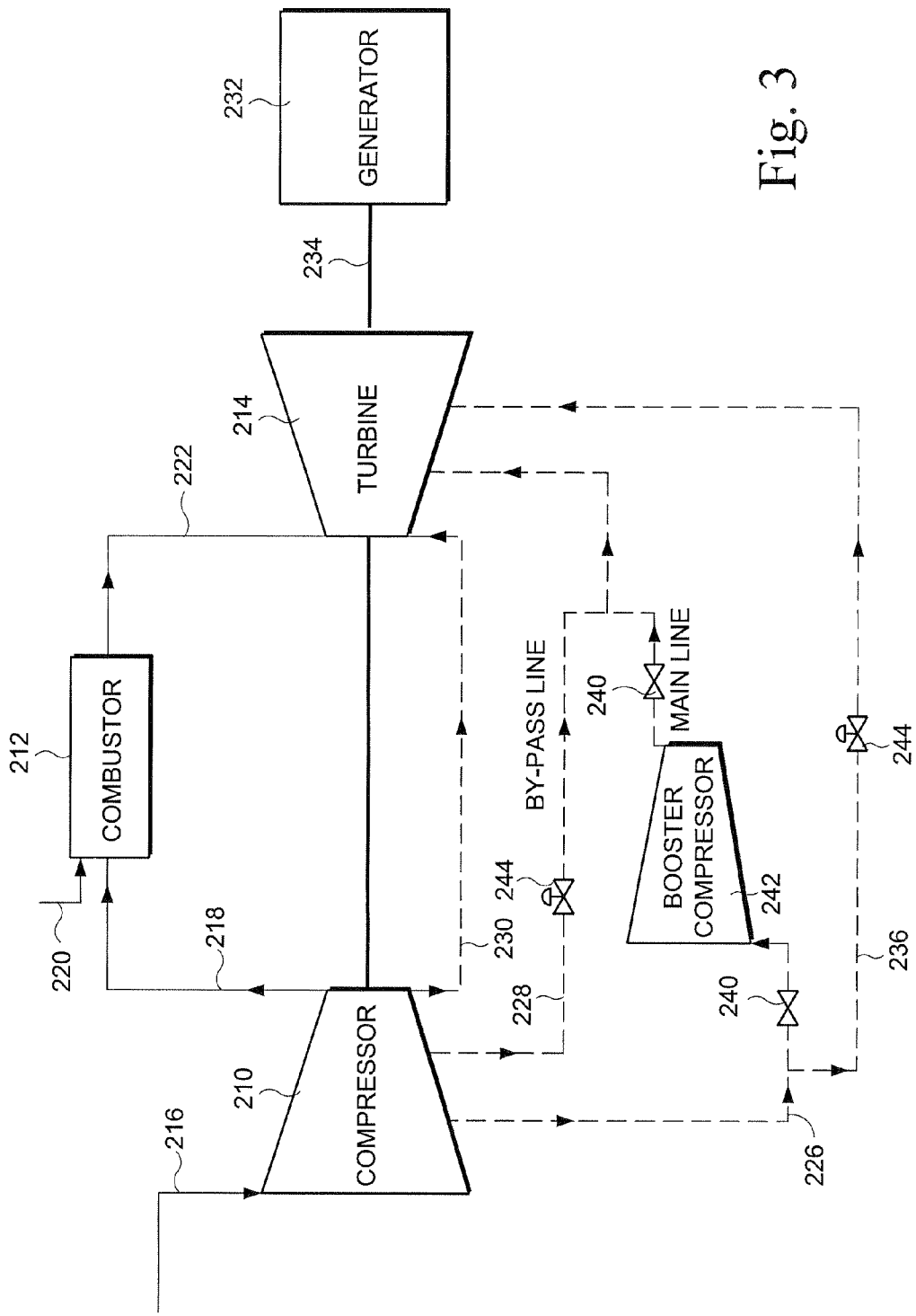
FIG. 3 is a schematic diagram of a cooling method for gas turbines according to an embodiment of the invention.

FIG. 3 shows an exemplary illustrative embodiment for controlling the characteristics of fluid flow in turbomachinery using selective boosting. Again, for the sake of convenience, reference numerals similar to those used in FIG. 1 are used for corresponding components, but with the prefix "2" added. The term selective boosting signifies raising the pressure of air, at least in part, extracted from an extraction stage of a compressor of the turbomachinery to a desired value, and then using this air for cooling and/or sealing of the gas turbine components of the turbomachinery, instead of directly using compressor air of high pressure as the cooling air.

In one exemplary illustrative embodiment, air 226 is extracted from a compressor stage having air of relatively lower pressure (for example, $9^{th}$ stage), which after passing through isolation valve 240 reaches external booster compressor 242. The external compressor raises the pressure of the input air to a required value and makes it available for cooling and/or sealing of a component, for example, turbine stage nozzle and cavity, of the turbine 214 downstream of the external booster compressor. In contrast, in conventional cooling systems, extraction from a higher stage other than lower stage (for example, $13^{th}$ stage of the compressor) is used to provide the cooling air that satisfies the back pressure requirement.

In another exemplary illustrative embodiment, a bypass line cooling the turbine with air 228 extracted from an intermediate pressure stage (for example, $13^{th}$ stage of the compressor) is provided. Air 228 passes through modulation valve 244 before it is delivered to the turbine 214. The provision of an existing line (see, for example, FIG. 1 and line 28 therein) to serve as the bypass line facilitates the cooling flow in case of an external compressor failure, thus restoring the cooling and/or sealing operation for the turbine, improving the reliability of the cooling and/or sealing system and ease of retrofitting this design to the existing systems.

In addition to the main line and the bypass line, there may be provided a line 236 branching off the main line 226. This corresponds to the same low pressure extraction line which supplies aft turbine stages as in the conventional cooling systems. Air 236 passes through modulation valve 244 before it becomes available at a different site of the turbine. Furthermore, line 230 represents relatively high pressure bleed air, extracted from, for example, stage 15 or stage 16 of the compressor, or a compression discharge point. This air is routed internally and is used for cooling other sites of the turbine, for example, combustion liners, stage 1 and/or 2 buckets, front stages and nozzles.

The usage of pressurized lower stage air eliminates the need for high compression ratios for the booster compressor. Furthermore the volumetric flow rates are reduced significantly, almost one-seventh compared to a conventional ambient air breathing cooling system, thus reducing the desired compressor size, weight and cost.

The cooling method of the exemplary illustrative embodiment presented herein eliminates the compressor work needed to raise the pressure much above the supply point pressure for the turbine component cooling. This enhances the gas turbine efficiency, and the net gas turbine output, even after adjusting for the booster compressor power that is required.

In addition, the decrease in discharge temperature of the cooling air due to reduced discharge pressure results in subsequent decrease in total air mass extracted from the compressor. This increases the non chargeable air availability, leading to increased mass flow to the combustor. The increased air can be used for augmenting the power output by burning more fuel in the GT.

The cooling and sealing system using selective boosting utilizes external, commercially available compressors, which may be powered, for example, using thermal, electrical, hydraulic, chemical source or a combination of them, which are far more efficient compared to devices like ejectors. Furthermore, their performance is not very sensitive to ambient day variations.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for supplying cooling and/or sealing fluid flow in turbomachinery, comprising:
   a) establishing a first fluid flow in the turbomachinery and flowing the first fluid flow to a first site in the exterior of the turbomachinery;
   b) establishing a second fluid flow at said first site, said second fluid flow having pressure higher than the pressure of said first fluid flow; and
   c) delivering said second fluid flow to a second site in the interior of the turbomachinery, wherein the step of establishing a first fluid flow includes extracting the first fluid flow from a stage of a compressor forming part of the turbomachinery, and the step of establishing a second fluid flow includes passing the first fluid flow through an external booster compressor, the method further including establishing a third fluid flow in the turbomachinery and delivering the third fluid flow into said second site of the turbomachinery, wherein the step of establishing a third fluid flow in the turbomachinery includes extracting the third fluid flow from another stage of said compressor forming part of the turbomachinery at a pressure higher than the pressure of said first fluid flow.

2. The method of claim 1, wherein
the step of delivering the second fluid flow to a second site includes providing said second fluid flow to a gas turbine component forming part of the turbomachinery.

3. The method of claim 1, further comprising
passing said first fluid flow through a first isolation valve before it enters said external booster compressor, and passing the fluid flow exiting the external booster compressor through a second isolation valve before it is delivered to said second site.

4. The method of claim 3, wherein
said passing of first fluid through said first isolation valve and raising its pressure to required level before delivering it as second fluid through said second isolation valve results in increase in the efficiency of the turbomachinery.

5. The method of claim 1, wherein
said second fluid flow provides cooling and sealing air at at least one of the second site and other locations of the turbomachinery.

6. The method of claim 1, further comprising passing said third fluid flow through a modulation valve.

7. The method of claim 1, wherein
the temperature of the second fluid flow is lower than that of the third flow, resulting in reduced cooling mass flow requirements, causing increased mass flow to a combustor forming part of the turbomachinery and increase of the output power of the turbomachinery.

8. An apparatus for supplying cooling and/or sealing fluid flow in turbomachinery, comprising:
   a) a first extraction port for establishing a first fluid flow in the turbomachinery and flowing the first fluid flow to a first site in the exterior of the turbomachinery;
   b) a component external to the turbomachinery at said first site for establishing a second flow at said first site, said second fluid flow having pressure higher than the pressure of said first fluid flow; wherein said second flow is delivered to a second site in the interior of the turbomachinery, wherein the first fluid flow is extracted from a first extraction port of a compressor forming part of the turbomachinery, and said first fluid flow passes through an external booster compressor to establish said second fluid flow, the apparatus further including a bypass line establishing a third fluid flow in the turbomachinery and delivering the third fluid flow into said second site of the turbomachinery, for increasing the reliability of the turbomachinery system and the capability of retrofitting to the existing system, wherein said third fluid flow is extracted from a second extraction port of said compressor forming part of the turbomachinery, said third fluid flow having pressure higher than the pressure of said fist fluid flow extracted from said first extraction port.

9. The apparatus of claim 8, wherein
the second fluid flow is delivered to a gas turbine component forming part of the turbomachinery.

10. The apparatus of claim 8, wherein
the booster compressor may be powered using one of thermal, electrical, hydraulic, chemical energy or a combination thereof.

11. The apparatus of claim 8, further comprising
a first isolation valve positioned between said first extraction port and said external booster compressor, and a second isolation valve positioned between said external booster and said second site.

12. The apparatus of claim 8, wherein
said second flow provides cooling and sealing air at at least one of said second site and other locations of the turbomachinery.

13. The apparatus of claim 8, further comprising
a modulation valve positioned between said second extraction port and said second site.

14. The apparatus of claim 8, wherein
the temperature of the second fluid flow is lower than that of the third flow, resulting in reduced cooling mass flow requirements, causing increased mass flow to a combustor forming part of the turbomachinery and increase of the output power of the turbomachinery.

* * * * *